(12) United States Patent
Henderson (10) Patent No.: US 6,193,786 B1
(45) Date of Patent: Feb. 27, 2001

(54) PORTABLE OIL DEGASIFICATION APPARATUS

(75) Inventor: J Henderson, San Ramon, CA (US)

(73) Assignee: Pacific Gas and Electric Company, San Francisco, CA (US)

( * ) Notice: Subject to any disclaimer, the term of this patent is extended or adjusted under 35 U.S.C. 154(b) by 0 days.

(21) Appl. No.: 09/209,557

(22) Filed: Dec. 11, 1998

(51) Int. Cl.[7] .................................................. B01D 19/00
(52) U.S. Cl. ........................ 95/171; 95/159; 95/263; 95/265; 55/356
(58) Field of Search ................... 55/356, 493; 95/159, 95/171, 263, 265; 261/DIG. 72; 210/519

(56) References Cited

U.S. PATENT DOCUMENTS

| | | |
|---|---|---|
| 3,013,631 * 12/1961 | Johnson | 95/171 |
| 3,339,346   9/1967 | Buchanan . | |
| 3,363,400 * 1/1968 | Takato et al. | 95/171 |
| 3,675,395   7/1972 | Baranowski . | |
| 3,883,642 * 5/1975 | Franke et al. | 95/171 |
| 4,574,420 * 3/1986 | Duprë | 55/356 |
| 5,163,985 * 11/1992 | Chen | 55/356 |
| 5,458,777 * 10/1995 | Khatib | 210/219 |
| 5,512,087 * 4/1996 | Varner et al. | 55/356 |
| 5,591,244 * 1/1997 | Vross et al. | 55/356 |
| 6,007,915 * 12/1999 | Rukovena | 261/DIG. 72 |

* cited by examiner

Primary Examiner—David A. Simmons
Assistant Examiner—Minh-Chau T. Pham
(74) Attorney, Agent, or Firm—Townsend and Townsend and Crew LLP (57) ABSTRACT

The present invention provides methods and devices for reducing the concentration of combustible gases in oils. The methods and devices of the invention are of particular use in reducing the concentration of combustible gases in insulating oils used in electrical devices such as transformers.

19 Claims, 4 Drawing Sheets

PORTABLE OIL DEGASIFICATION APPARATUS

FIELD OF THE INVENTION

This invention relates to the exchange of a noncombustible gas for a combustible gas in a liquid. More particularly, this invention relates to the reduction of combustible gas content in oil from electrical apparatus.

BACKGROUND OF THE INVENTION

The principal function of transformer oil is to provide electrical insulation and to cool transformer windings by absorbing the heat generated during operation and conducting it to the exterior surfaces. In switch gear and circuit breakers oil also quenches the electric arc. To carry out its functions in the most efficient way, insulating oil must be of good quality and free of contamination. Some electrical and electronic apparatus requires insulating oil of a superior quality in respect to freedom from contamination in order to insure high dielectric strength and extended service life under extreme stresses. Also, cables, extra high voltage transformers, bushings, and capacitors are in this category and require oil of high purity.

The presence of contaminants in the oil can adversely affect the insulating properties of the oil. Contaminants and products of oil deterioration reduce dielectric strength of oil by forming a path of low resistance for electric discharge through the oil. Further, when the contaminants are combustible gases, the potential for explosion exists.

There are many types of contamination, such as water, solid particles of dust, metals, colloidal carbon, products of corrosion, acids, resins, gums, tar, sludge, organic contaminants and solvents, air and gases.

Contamination enters insulating oil in many ways. Some occurs in various phases of oil transfer from the refinery to the point of use. Some contaminants enter through breather vents or during the process of filling or overhaul. Some moisture and contamination can be found even in new transformers as soluble water and air are present in oil. Water in its free phase may be present either dispersed in form of emulsion or settled at the bottom of the reservoir. With synthetic oils, which are heavier than water, water will tend to collect at the surface or near the top of the transformer.

Contaminants can also be introduced through the degradation of the oil under the extreme conditions existing inside the electrical apparatus. This degradation can give rise to combustible gases. Gases which are typically found in transformer oils include ethane, ethylene, acetylene, methane, carbon dioxide, carbon monoxide, hydrogen and oxygen. Protection of electrical apparatus by continuous or frequent purification of insulating oils will eliminate costly breakdowns and assure a safe and dependable operation.

Purification and reconditioning of transformer oil are practiced in the art. As described in the Institute of Electrical and Electronic Engineers Guide for Acceptance and Maintenance of Insulating Oil in Equipment (ANSI/IEEEC57.106-1977), the reconditioning step when contacting the oil with filter media and/or when performing the mechanical separation of oil and water by centrifuging must be accomplished at low temperature to avoid a high level of dissolved water in the oil, since the saturation amount increases rapidly with temperature. The Guide further describes that in reclaiming, the oil is usually treated by contact with Fuller's earth, an adsorbent clay material which is effective in removing the oxidation products and acids.

The above Guide also describes vacuum dehydrators (degasifiers) as an efficient means of reducing water and gas in the oil to a very low value. There is considerable other literature which describes this vacuum treatment step. Typical references to this step are U.S. Pat. No. 3,675,395 (Jul. 11, 1972) by Baranowski and U.S. Pat. No. 3,339,346, (Sep. 5, 1967) by Buchanan, both of which describe an apparatus for heating, filtering/coalescing and vacuum degasifying of transformer oil, and an article by Schenck in January 1983 Transmission and Distribution magazine describing apparatus for heating, filtering and vacuum degasifying of transformer oils. This latter reference discusses use of a cold trap operating at −85° F. to obtain adequate vacuum to sufficiently reduce the water content to meet specifications. This cold trap is refrigerated with a cascade refrigeration unit to attain the very low temperature.

These methods of degasifying transformer oils require costly equipment and the input of energy to heat the oil, to run the vacuum pumps and to maintain the cold trap system to protect the vacuum pumps. As such, these devices are more appropriately considered stationary devices that might reside in a central power generation station or an oil recycling station. For processing oil from transformers which are located in areas remote from such stations, it is extremely useful to have an oil degasifying device which can be easily transported to the transformer location. Of even greater use is a degasifying unit which is of simple design, inexpensive to build and which requires a minimal input of energy to run. The present invention provides such a device and methods for using this device.

SUMMARY OF THE INVENTION

When electrical transformers are located at sites which are remote from central power generating stations and oil recycling/disposal stations, it is necessary to transport contaminated oil to an appropriate station for either recycling or disposal. The transportation of contaminated oil is a hazardous activity because of the combustible gases which are often dissolved in the oil. Previous methods for degasifying oil have relied on devices which use vacuum pumps and the attendant apparatus in conjunction with an absorption column to remove dissolved gases and other impurities from the oil. These systems can be difficult to transport and are expensive to build, to maintain and to operate.

This invention provides methods and devices for removing combustible gases from transformer oil which eliminate the need to heat the oil and the necessity for any vacuum apparatus. Further, an absorption column is not a necessary component. The simple methods and devices of the invention provide for removing an amount of combustible gas from the transformer oil sufficient to render the oil safe for transportation and recycling.

Thus, in a first aspect, the present invention provides a method utilizing a device for reducing combustible gas concentration in an oil, the method comprising:

(a) contacting a first inert gas and the oil in a first gas-oil contact device to form a first inert gas-oil mixture;

(b) passing the first inert gas-oil mixture into a second gas-oil contact device comprising a packed bed wherein said first gas-oil mixture and a second inert gas are contacted in countercurrent flows, thereby forming a combustible gas-inert gas mixture; and (c) venting the combustible gas-inert gas mixture from said device.

In a second aspect, the present invention provides a device for reducing combustible gas concentration in an oil. The device comprises a column for a packed bed, a gas-oil contact device adapted to combine oil and a first inert gas flow into a first gas-oil mixture and a manifold which provides a means for passing the first gas-oil mixture and a second inert gas through the column in countercurrent flows.

In a third aspect, the present invention provides a transportable device for reducing combustible gas concentration in an oil. The device comprises a column for a packed bed which is pivotally mounted to a trailer bed for pivoting between a first position in which the column is vertical and a second position in which the column is horizontal. The device also has a gas-oil contact device adapted to combine oil and gas flows into gas-oil mixture. The device utilizes a manifold to provide means for passing a gas and the gas-oil mixture through the column in countercurrent flows when the column is in the first position.

Other objects and advantages of the present invention will be apparent from the detailed description and examples that follow.

DETAILED DESCRIPTION OF THE INVENTION AND THE PREFERRED EMBODIMENTS

DEFINITIONS

As used herein, the term "manifold" refers to an arrangement of pipes, valves and, optionally, metering devices which allows gas, oil and oil-gas mixture streams to be controlled in both volume and pressure, to be combined and/or separated, and to be routed to a selected portion of the device of the invention.

As used herein the term "trailer bed" refers to both motorized and unmotorized transportation devices, more specifically, the load-carrying portion of such a device. For example, a "trailer bed" can be the load-carrying portion of a vehicle such as a pickup, flat bed truck, semi-truck and trailer, railroad car and the like. Further, a trailer bed can be a nonmotorized device which is adapted for towing by a motorized device.

The term "inert gas," as used herein, refers to any gas or mixture of gases which is non-combustible under conditions which exist in the device of the invention or while practicing the methods of the invention.

The term "combustible gas," refers generally to gases which are subject to ignition (e.g., ethane, methane, acetylene, etc.). This term also includes mixtures of combustible gases and gases generally thought to be nonflammable such as carbon monoxide, carbon dioxide and the like.

The term "contacting," is used herein interchangeably with such terms as "dissolving in," "mixing," "injecting," bubbling through," and the like.

"Stripping," as used herein, refers to the reduction of combustible gas concentration in an oil. "Stripping" refers to partially or completely removing the combustible gas from the oil.

This invention provides methods and devices for reducing the combustible gas content of oils used as insulators, heat sinks and dielectrics in electrical devices, particularly electrical transformers.

INTRODUCTION

The portable oil degasification apparatus is an application of the fundamental mass transfer unit operations in performing combustible gas extraction from the oil. The inert gas, which contains no combustible components, is brought into intimate contact with the oil containing dissolved combustible gas. Because the vapor pressure of the combustible gas dissolved in the oil is greater than the equilibrium vapor pressure in the inert gas, a driving force exists to transfer combustible gas from the oil into the inert gas.

Combustible components continue to be transferred from the oil to the inert gas until the partial pressure of the combustible components in the gas are in equilibrium with the vapor pressure of the combustible components in the oil. Once equilibrium is established no additional mass transfer occurs. Each combustible gas component has a different equilibrium solubility in the oil. The portable oil degasification process was designed to remove most of the more volatile components and sufficient amounts of the less volatile components to make the oil safe for storage and transportation.

METHODS

In a first aspect, the present invention provides a method utilizing a device for reducing combustible gas concentration in an oil, the method comprising:

(a) contacting a first inert gas and the oil in a first gas-oil contact device to form a first inert gas-oil mixture;

(b) passing the first inert gas-oil mixture into a second gas-oil contact device comprising a packed bed wherein said first gas-oil mixture and a second inert gas are contacted in countercurrent flows, thereby forming a second gas-oil mixture and combustible gas-inert gas mixture; and (c) venting the combustible gas-inert gas mixture from the device.

In a presently preferred embodiment, the packed bed has an upper end and a lower end, the upper end having therein an oil inlet and a gas outlet through which the combustible gas-inert gas mixture is vented. The lower end has a gas inlet and an oil outlet. In another preferred embodiment, the first gas-oil mixture enters the column through the oil inlet and is contacted with a second inert gas entering the column through the gas inlet. The first gas-oil mixture and the second inert gas pass through the column in countercurrent flows. In yet a further preferred embodiment, the oil, stripped of combustible gases, is drained from the column through the oil outlet in the lower end of the column.

In a preferred embodiment, the method of the invention further comprises, (d) passing said second gas-oil mixture into a third gas-oil contact device to form a third gas-oil mixture.

The present degasification method relies on gas-oil contact devices to enhance to transfer of combustible gas components from the oil to the inert gas. These enhancements primarily are ways to increase surface area for the contact of the inert gas and the oil to speed up the mass transfer process. In the discussion that follows, oil and inert gas contacted in the gas-oil contact device create a mixture of very fine inert gas bubbles within the oil. These small bubbles provide a much larger surface area for the transfer of combustible components from the liquid into the inert gas stream. The inert gas and the oil are contacted in co-current fashion in the gas-oil contact device resulting in a mixture of gas bubbles and oil moving together in the same direction through the process piping. Because the contact is co-current, sufficient residence time is needed for the mass transfer to occur approaching equilibrium concentrations. In a presently preferred embodiment, the residence time is from about 10 seconds to about 3 minutes, more preferably from about 20 seconds to about 1.5 minutes.

The gas oil mixture is discharged into the packed bed column where the inert gas stream disengages from the mixture and exits out the exhaust in the top of the column. The oil cascades downward through the random packing which provides increased surface area for mass transfer of combustible components. The packing also provides the shear force necessary to expose a fresh layer oil to the surface as it flows over the packing. Inert gas passes upward through the packed bed column counter current to the oil flow. The present configuration of the column operates with an inert gas to oil ratio of about 0.2 cubic feet gas per gallon of oil. The total combustible gas concentration in the inert gas exhausted from the column rarely exceeds 1%. Thus, the potential for ignition of the extracted combustible gas is very remote. The overall extraction efficiency for the combined venturi and packed bed column with eight feet of packing is in excess of 85% hydrogen, 75% methane, 65% ethane, 50% ethylene and 50% acetylene.

Figure 1:
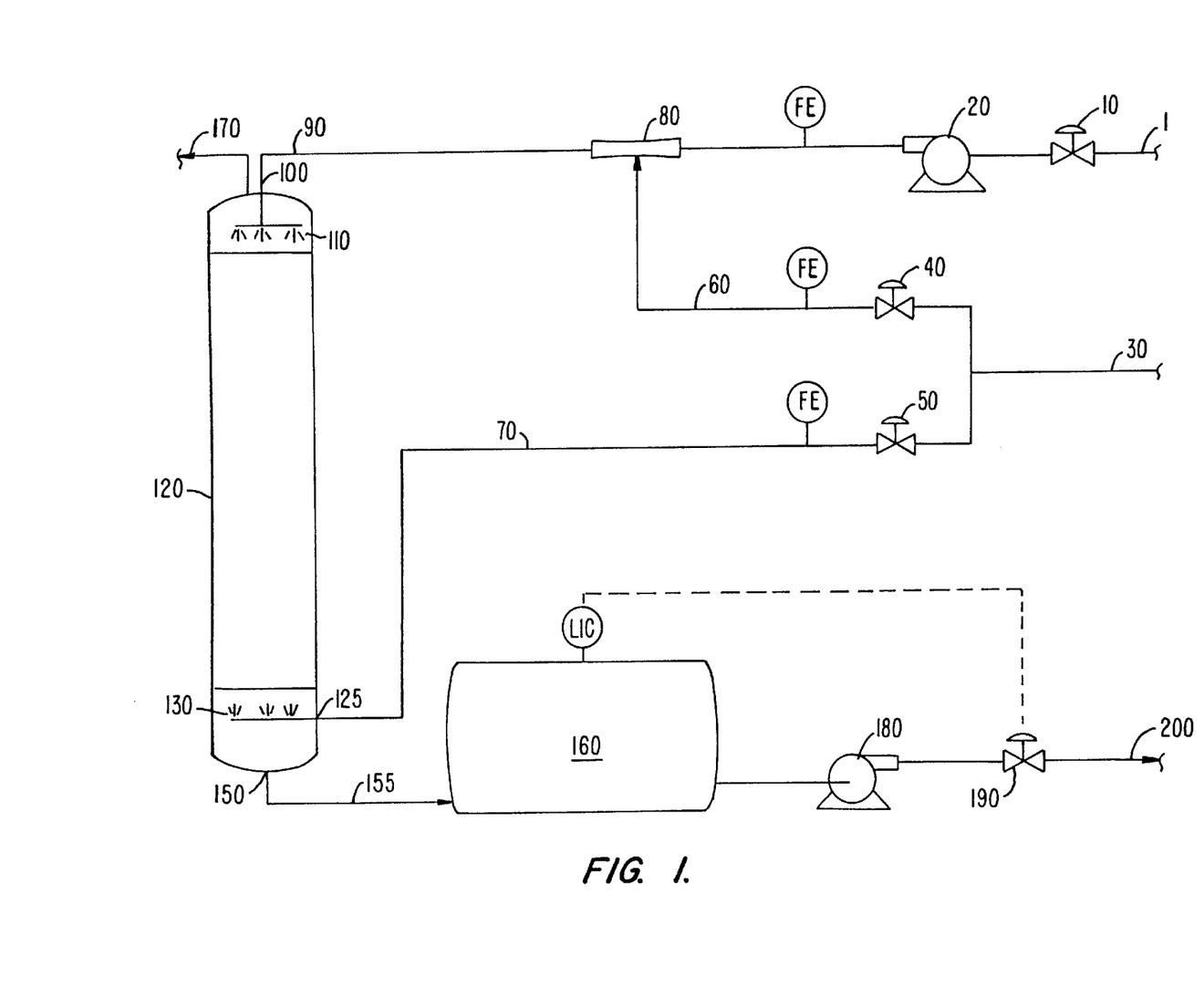
FIG. 1 is a flow schematic illustration of a device of the invention utilizing two gas-oil contact devices.

The operation of the process of the invention will be better understood by reference to FIG. 1 which displays a representative process flow diagram for an embodiment of the process of the invention utilizing a single inert gas.

The contaminated oil enters the device through oil inlet 1 by the action of inlet pump 20. The flow of oil can be controlled by valve 10. Inert gas enters the system under pressure through inert gas inlet 30. The inert gas supply then splits into two separate flows.

In one flow, the inert gas travels through valve 40 into conduit 60 and then into first gas-oil contact device 80. In the gas-oil contact device, an intimate mixture of the contaminated oil and the inert gas is formed as the oil is forced through the gas-oil contact device by the action of pump 20. The gas-oil mixture leaves gas-oil contact device 80 through conduit 90 and enters the packed bed through port 100. The gas-oil mixture is applied to the upper surface of the packed bed 120 by means of a distributor device 100.

The second inert gas flow passes through valve 50 and into conduit 70. Conduit 70 enters the column for the packed bed through a port 125 at the lower end of the column. The inert gas passes through a dispersion device 130 and into the packed bed.

As the inert gas is flowing upwards from dispersion device 130 through the packed bed 120, the gas-oil mixture from distributor 110 is flowing downwards through the packed bed. The flow of the inert gas over the oil which is dispersed upon and coats the packing components of the packed bed carries the combustible gases out of the oil. The mixture of inert and combustible gases exits through vent 170 that is located at the top of the column.

The oil which has passed through the packed bed and has been stripped of dissolved combustible gases passes out of the packed bed through port 150 into conduit 155. Conduit 155 is connected to an oil holdup tank 160. The oil can be transported to a recycling, disposal or storage station while contained in the hold up tank. The oil is removed from the hold up tank by means of oil outlet pump 180, through valve 190 and ultimately out of port 200.

Figure 2:
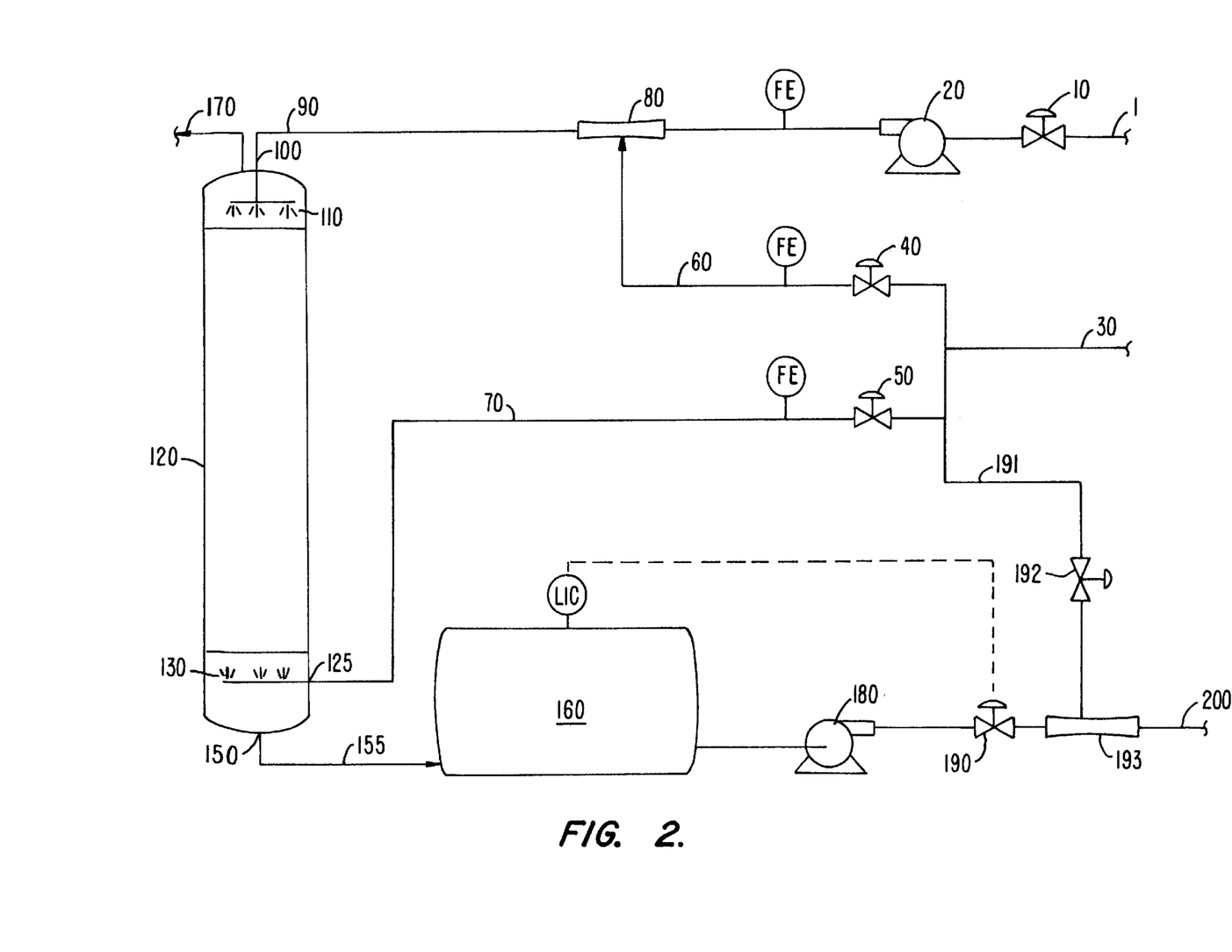
FIG. 2 is a flow schematic illustration of a device of the invention utilizing three gas-oil contact devices

The process flow scheme illustrated in FIG. 1 is intended to provide a single exemplary embodiment of the process of the invention. Other useful modifications of this process will be apparent to those of skill in the art and are within the scope of the present invention. For example, FIG. 2 illustrates a preferred embodiment of the invention in which the device further comprises a third gas-oil contact device. In this embodiment, the third device is preferably a venturi device.

The operation of the device displayed in FIG. 2 is substantially the same as that displayed in FIG. 1, with the several notable exceptions. First, the inert gas is split into three separate flows. Second, the inert gas flows through 191 and into valve 192 and into the third gas-oil contact device 193. In the gas-oil contact device, an intimate mixture of the second-gas-oil mixture and the inert gas is formed, producing a third gas-oil mixture, as the oil is forced through the third gas oil contact device by the action of pump 180. The third gas-oil mixture leaves the third gas-oil contact device 193 through conduit 200, entering an oil storage tank from which the inert and combustible gas mixture is vented.

Any inert gas or combination of inert gases can be used to practice the present invention. In a preferred embodiment, gases such as air, nitrogen, argon, helium, carbon dioxide and combinations thereof are used. More than one inert gas or mixture of inert gases can be used at different stages of the process. For example, in one embodiment, the first and second inert gases are different inert gases or different mixtures of inert gases.

In a presently preferred embodiment, the first inert gas and the second inert gas are the same inert gas. In another preferred embodiment, the inert gas is nitrogen. The gases can be supplied by any means known in the art including tanks, compressors and in situ generators. In a preferred embodiment air is used and is supplied by a tank or by means of a compressor.

Any of a wide array of gas-oil contact device types known in the art are useful in conjunction with the present invention. Usefull gas-oil contact devices include those utilized in the art in gas absorption operations, such as venturi systems, spray towers, tray towers and packed towers. Other useful gas-oil contact devices include, for example, hydraulic nozzles and atomizers. Atomizers useful in practicing the present invention include, for example, hollow cone (e.g., whirl chamber, grooved core), solid cone, fan spray (e.g., oval or rectangular orifice, impinging jets), nozzles with wider range of turndown (e.g., spill, poppet), two-fluid, sonic, rotary wheels and ultrasound. See, for example, Perry's Chemical Engineer's Handbook, $7^{th}$ Ed, Perry and Green, Eds., McGraw-Hill, N.Y, 1997, pp.14–62 to 14–69, and references therein which are incorporated herein by reference.

The use of any type or combination of types of gas-oil contact devices is within the scope of the present invention. Further, more than one gas-oil contact device can be placed in line upstream from the packed column. When more than one device is used, this arrangement is encompassed within the term "first gas-oil contact device." When more than one gas-oil contact devices are used, they can be the same type of device or, alternatively, they can be different types of devices. Further, when more than one gas-oil contact device is used, they can all be upstream from the packed bed column or they can be located both upstream and downstream from the packed bed column. One of skill in the art will be able to determine the correct number, combination and arrangement of gas-oil contact devices to produce a desired result. Although the following discussion relies on a venturi system as an exemplary first gas-oil contact device, this reliance is in the interest of brevity only and is not intended to limit the number, type or arrangement of gas-oil contact devices within the scope of the present invention.

In a presently preferred embodiment, the first gas-oil contact device comprises a venturi device. Venturi devices are well-known in the art. These devices provide effective contact between liquid and gas with maximum surface contact and minimum consumption of energy. In its simplest form a venturi device is a tube with a constriction in its inner surface. The constriction causes a pressure drop in fluid as it flows through it. Venturi devices are generally fabricated as a short straight pipe section between two tapered sections. Other appropriate configurations for venturi devices are known to those of skill in the art.

At the initiation of the process of the invention, the atmosphere within the first gas-oil contact device preferably comprises an inert gas. As the contaminated oil passes through the first gas-oil contact device, it contacts the inert gas forming a first gas-oil mixture. In a preferred embodiment, the oil enters the venturi system under pressure. In another preferred embodiment, the oil is pumped into the venturi system.

Any of a broad range of pumps known in the art is appropriate for use in conjunction with the present invention. Exemplary pump types include, but are not limited to centrifugal pumps, propeller pumps, turbine pumps, positive displacement pumps (e.g., reciprocating, rotary), gear pumps, screw pumps, jet pumps and the like. See, for example, Perry's Chemical Engineer's Handbook, 7th Ed, Perry and Green, Eds., McGraw-Hill, New York, 1997, pp 10–24 to 10–35 and the references therein, all of which are incorporated herein by reference.

After the first gas-oil mixture exits the gas-oil contact device it enters a column which comprises a packed bed. In a presently preferred embodiment, the first gas-oil mixture enters the column from the top of the column and an inert gas is fed into the packed bed from the bottom of the column. As the first gas-oil mixture travels down the length of the packed bed, it is intimately contacted with the upward stream of inert gas in countercurrent flows.

Packed bed columns are relatively simple structures. The simplest packed bed columns are generally of cylindrical cross-section and have one packed bed that rests on an open-type support. In these simple columns, the packing is dumped into the column and, consequently, the packing is randomly ordered. The packed column can also contain a suitable liquid distribution device above the packed bed. The next order of complexity utilizes beds in which the packing is carefully arranged. Still more complex packed columns can have two or more packed beds separated by open-type supports.

A number of random packing materials are known to those of skill in the art. These include, but are not limited to Raschig rings (various dealers), Berl saddles (various dealers), Intalox saddles (Norton Co., Akron, Ohio), Pall rings (Norton Co.), Cascade minirings (Glitsch, Inc., Dallas, Tex.), Fleximax (Koch Engineering Co., Wichita, Kans.), Nutter rings (Nutter Engineering Co., Tulsa, Olka.), Snowflake (Norton), Nor-Pak (NSW Corp., Roanoke, Va.), Tri-Pak (Jaeger Products, Inc., Houston, Tex.), VSP (Jaeger Products Inc.) and Tellerettes (Celicote Co., Berea, Ohio).

In addition to random packings, a wide variety of structured packings is also commercially available. Structured packings include, but are not limited to, Flexipac (Koch Engineering Co,), Flexiramic (Koch Engineering Co.), Gempak (Glitsch, Inc.), Intalox Norton Co.), Max-Pak Jaeger Products, Inc.), Mellapak (Sulzer Bros., Winterthur, Switzerland), Montz-Pak (Julius Montz, Hilden, Germany), Ralupak (Raschig AG, Ludwigshafen, Germany) and Sulzer (Sulzer Bros.).

Random and structure packing materials are available in a range of sizes and one of skill in the art will be able to select an appropriate size for use in a particular application.

Both structured and unstructured packings are produced in several materials including, sheet metal, metal gauze, expanded metal, ceramic, plastic (e.g., polypropylene), glass, and the like.

In a presently preferred embodiment, the packed bed column incorporates a single packed bed with a random distribution of the packing material. In a further preferred embodiment, the packing is a saddle-type packing. In a still further preferred embodiment, the saddle-type packing is composed of polypropylene. In yet a further preferred embodiment, the packing material is from about 0.5 inches to about 1.5 inches in length.

Although packed bed columns having a variety of shapes and configurations are known in the art, a common principle generally governs their operation. Typically, the oil enters the column through the top, through a liquid distributor. An inert gas is introduced from the lower end of the column. The oil flows downward through the packed bed countercurrently with respect to the inert gas flow. Both the oil and the gas flow through the same interstices between the packing elements. At low liquid and gas flow rates, the descending liquid occupies only a small fraction of the interstices, offering little resistance to the rising gas flow. As the gas flow rate increases, the liquid is held up in the interstices until, at still higher gas flow rates, the oil can no longer flow downward and the packing floods.

The process of the invention can be practiced over a wide range of gas flow rates to oil ratios. The choice of a correct gas to oil ratio will be apparent to those of skill in the art. In a preferred embodiment, the ratio is from about 0.1 cubic feet of inert gas to 1 gallon of oil to about 1 cubic foot of gas to 1 gallon of oil The rate of oil flow can be manipulated by increasing or decreasing the output from the oil inlet pump, by appropriate adjustment of the in-line valves or by judicious choice of conduit lengths and/or widths. Alternatively, the process can be varied by placing the apparatus under partial vacuum by means of a vacuum device while inert gas is pumped into the device. Similar methods can be used to regulate the inert gas flow.

Packed columns are generally designed to operate at a percentage of flooding (e.g., 60–70%). Operating conditions for columns having different sizes and packing materials which achieve efficient processing of the oil without flooding the column packing can be routinely selected by those of skill in the art.

Support plates for packed bed columns are well-known in the art. The primary purpose of the packing support is to retain the packing bed without excessive restriction of gas and liquid flow, it can also be utilized to direct the streams of gas, oil and gas-oil mixture. Column support plates have been carefully designed to avoid premature column flooding. Typical countercurrent support rings are the welded ring support and the wire mesh support. In the present device, it is desirable to have a support device on top of the packed column to support the packing when the column is in the horizontal position for transportation. Other support rings of use in the present invention will be apparent to those of skill in the art.

In addition to the packed bed and packed bed support, the columns of the present invention can also include a device for promoting uniform liquid distribution. Uniform initial liquid distribution at the top of the packed bed aids in efficient column operation. This is typically accomplished by a device that spreads the liquid uniformly across the top of the packed bed. A general design principle recommends that the device provide one liquid stream for each 194 $cm^2$ of column area. A similar system that varies the number of liquid streams as the column width varies has been developed. Thus, art preferred columns utilize 40 liquid streams/$m^2$ for columns of diameter 1.2 m and greater. For columns of 0.75–1.2 m in diameter, 170 streams per $m^2$ are preferred. For columns having a diameter between 0.40–0.75 m, 340 streams/$m^2$ are preferred. See, for example, Eckert, *Chem. Eng. Prog.* 57: 54 (1961).

There are numerous designs for liquid distribution devices known in the art. In a presently preferred embodiment, utilizing a liquid distributor, the distributor is a member selected from the group consisting of perforated pipe distributors, orifice type distributors, trough type distributors, weir-riser distributors and spray nozzles. When spray nozzles are used, it is preferred to use a bank of spray nozzles comprising two or more nozzles.

In addition to the method of the invention, the present invention includes devices for reducing combustible gas concentration in an oil. The discussion above in the context of the method of the invention is equally applicable to those aspects of the invention which are drawn to a device for reducing combustible gas concentration in an oil.

In a second aspect, the present invention provides a device for reducing combustible gas concentration in an oil. The device comprises a column for a packed bed, pivotally mounted to a trailer bed for pivoting between a first position in which the column is vertical and a second position in which the column is horizontal. The device also includes a gas-oil contact device mounted to the trailer bed and adapted to combine oil and gas flows into gas-oil mixture. Connecting the components of the device is a manifold mounted to the trailer bed and providing means for passing the gas-oil mixture through the column when in the first position and for passing a gas through the column in countercurrent flows.

In a third aspect, the present invention provides a transportable device for reducing combustible gas concentration in an oil. The device comprises a column for a packed bed which is pivotally mounted to a trailer bed for pivoting between a first position in which the column is vertical and a second position in which the column is horizontal. The device also has a gas-oil contact device adapted to combine oil and gas flows into gas-oil mixture. The device utilizes a manifold to provide means for passing a gas and the gas-oil mixture through the column in countercurrent flows when the column is in the first position.

Any of a number of gas-oil contact devices can be used in conjunction with the present invention. In a preferred embodiment, the first gas-oil contact device is a member selected from the group consisting of venturi devices, spray tower devices, tray tower devices and packed column devices. Additionally, the device can include more than one gas oil contact device. Thus, in a preferred embodiment, the device comprises at least two gas-oil contact devices.

Any number of inert gases are useful in practicing the present invention and more than one gas can be used. Thus, in a preferred embodiment, a first gas is passed through the first gas-oil contact device and a second gas is passed through the packed bed. The first and second gases can be either the same gas or different gases and are members independently selected from the group consisting of air, nitrogen, argon, helium, carbon dioxide and combinations thereof.

An array of art-known packed bed column designs can be used to practice the present invention, in a presently preferred embodiment, the column comprises a support for said packed bed. The column can also include a single packed bed or more than one packed bed. Thus, in another preferred embodiment, the present invention provides a column which comprises at least two packed beds. When more than one packed bed is utilized, in a preferred embodiment, the column comprises a support for each of said at least two packed beds.

Many useful packings for packed bed columns are commercially available or can be custom fabricated according to designs and procedures which are known in the art. In a preferred embodiment, the devices of the invention utilize a packing which is a member selected from the group consisting of meshes, Raschig rings, saddles, beads, coils, helices and combinations thereof. In a still further preferred embodiment, the packing is fabricated from a material which is a member selected from the group consisting of glass, teflon, metal, plastics, ceramics and combinations thereof.

In a presently preferred embodiment, the packing is a polypropylene saddle. In yet a further preferred embodiment, the packing is a polypropylene saddle and it is from about 0.5 inches in length to about 1.5 inches in length.

It will frequently be preferred to include in the devices of the invention, a means for efficiently distributing the oil onto the packed bed. Thus, in a preferred embodiment, the devices of the invention further comprise an oil distribution device. Many designs of oil distribution devices are known in the art and can be used in conjunction with the present invention. In a presently preferred embodiment, the oil distribution device is a member selected from the group consisting of perforated pipe distributors, orifice type distributors, trough type distributors, weir-riser distributors, spray nozzles and combinations thereof.

The dimensions of the packed column can be chosen from a range of height and diameters combinations. The height of the individual packed beds is generally limited by the strength of the packing or by the need to redistribute the liquid such that good mass-transfer efficiency can be obtained. Although a wide range of column heights and diameters can be used in practicing the present invention, in a presently preferred embodiment, the height of the bed is from about 5 feet to about 15 feet. In a preferred embodiment, the height of the column is from about 8 feet to about 12 feet. When bed heights exceed 10 feet, it is preferred to use a multiple bed column. The individual beds of the multiple bed column have heights selected to maintain the compressive load on the packing material below the point at which this load will crush the material.

In a further preferred embodiment, the width of the column is from about 8 inches to about 36 inches, more preferably from about 16 inches to about 20 inches in diameter.

The column can be constructed of virtually any substantially rigid material which is chemically resistant to the oil and the gases dissolved therein. Appropriate materials include, but are not limited to, metals, plastics, composites and combinations of these materials. In a presently preferred embodiment, the device is constructed of poly(vinyl chloride).

Figure 3:
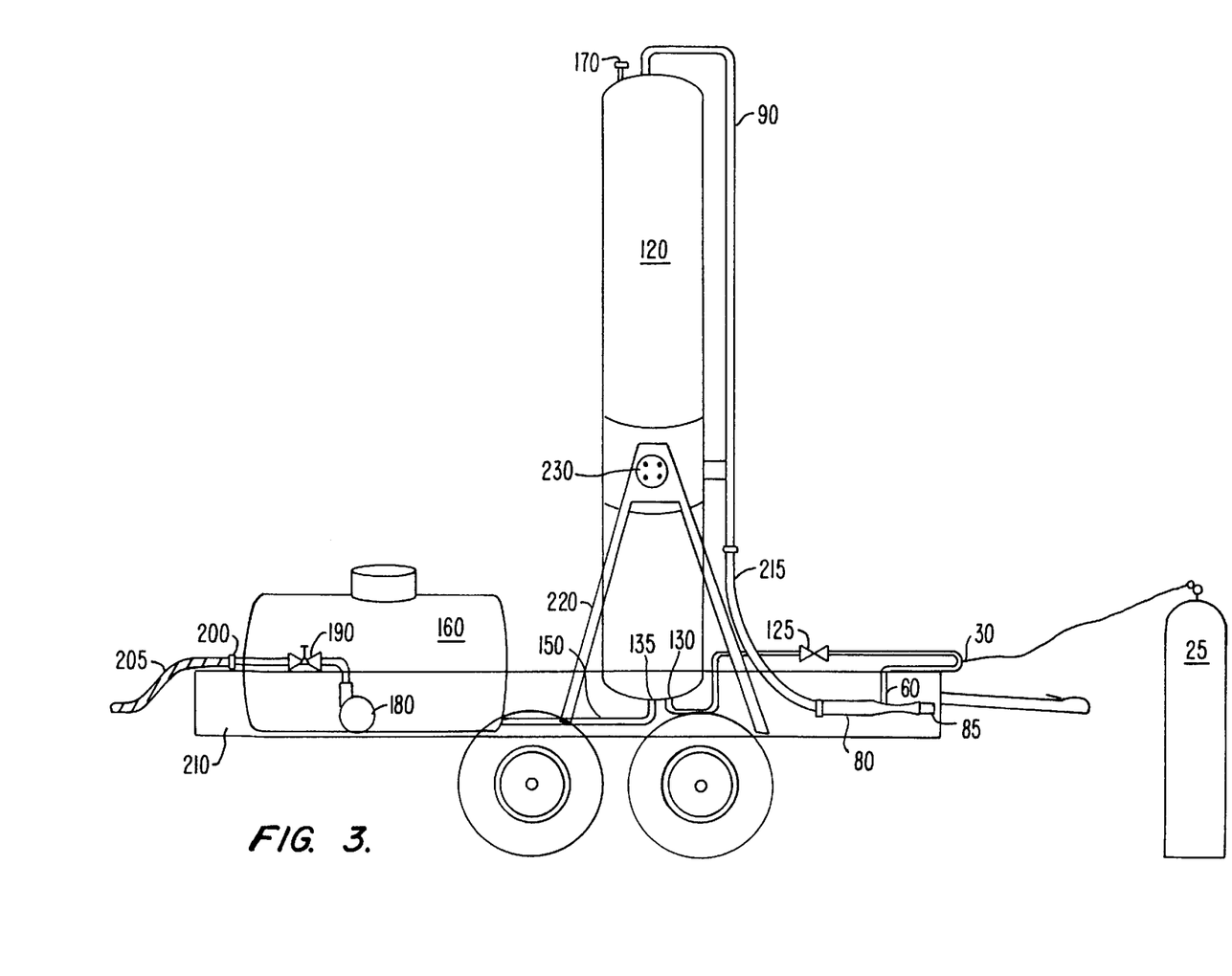
FIG. 3 is an illustration of a device of the invention, utilizing two gas-oil contact devices, arranged for operation.

An exemplary device of the invention, utilizing two gas-oil contact devices, is displayed in FIG. 3, which illustrates a device in its operable position. Inert gas is supplied to the device by inert gas supply 25. The inert gas enters the device through inert gas entry port 30 and it flows into separate conduits 60 and 125.

Conduit 60 directs the inert gas flow into the first gas-oil contact device, here shown as venturi unit 80. The oil enters the venturi unit through oil inlet port 85. In operation, the venturi unit is attached to a conduit 215 that serves to couple the venturi outlet to inlet 90 of packed bed column 120.

Conduit 125 directs a flow of inert gas into packed bed column 120 through packed bed column inert gas inlet 130 located at the bottom of the column. In operation, the inert gas travels in upwards through the packed bed column. As it flows through the packing onto which the oil is coated, the inert gas carries the combustible gases out of the oil and out of the device through packed bed column gas outlet 170.

The packed column is anchored to trailer bed 210 by means of two supports 220 one of which is located on each side of the trailer bed. The supports are equipped with pivot devices 230 which allow the column to be rotated between positions in which the long axis of the column is in a horizontal, vertical or intermediate position. In a presently preferred embodiment, the trailer bed is equipped with vertical sides that can act to trap and contain oil that is spilled during the process or in case of cataclysmic device failure.

As oil which has been scrubbed of combustible gases reaches the lower end of the packed bed column, it exits the scrubbing phase of the device through packed bed column oil outlet 135, entering conduit 150 that couples the packed bed column oil outlet and hold up tank 160. Hold up tank 160 is equipped with hold up tank outlet pump 180 that is attached through valve 190 to hold up tank oil outlet 200. To drain the oil from the hold up tank, outlet 200 is attached to a length of conduit 205 which can terminate in a larger storage tank, recycling apparatus, disposal apparatus or the like.

When the oil scrubbing operation is complete, it can be rotated through pivot device 230 into a position appropriate for transportation. An embodiment of the apparatus in the transportation position is illustrated in FIG. 4.

Figure 4:
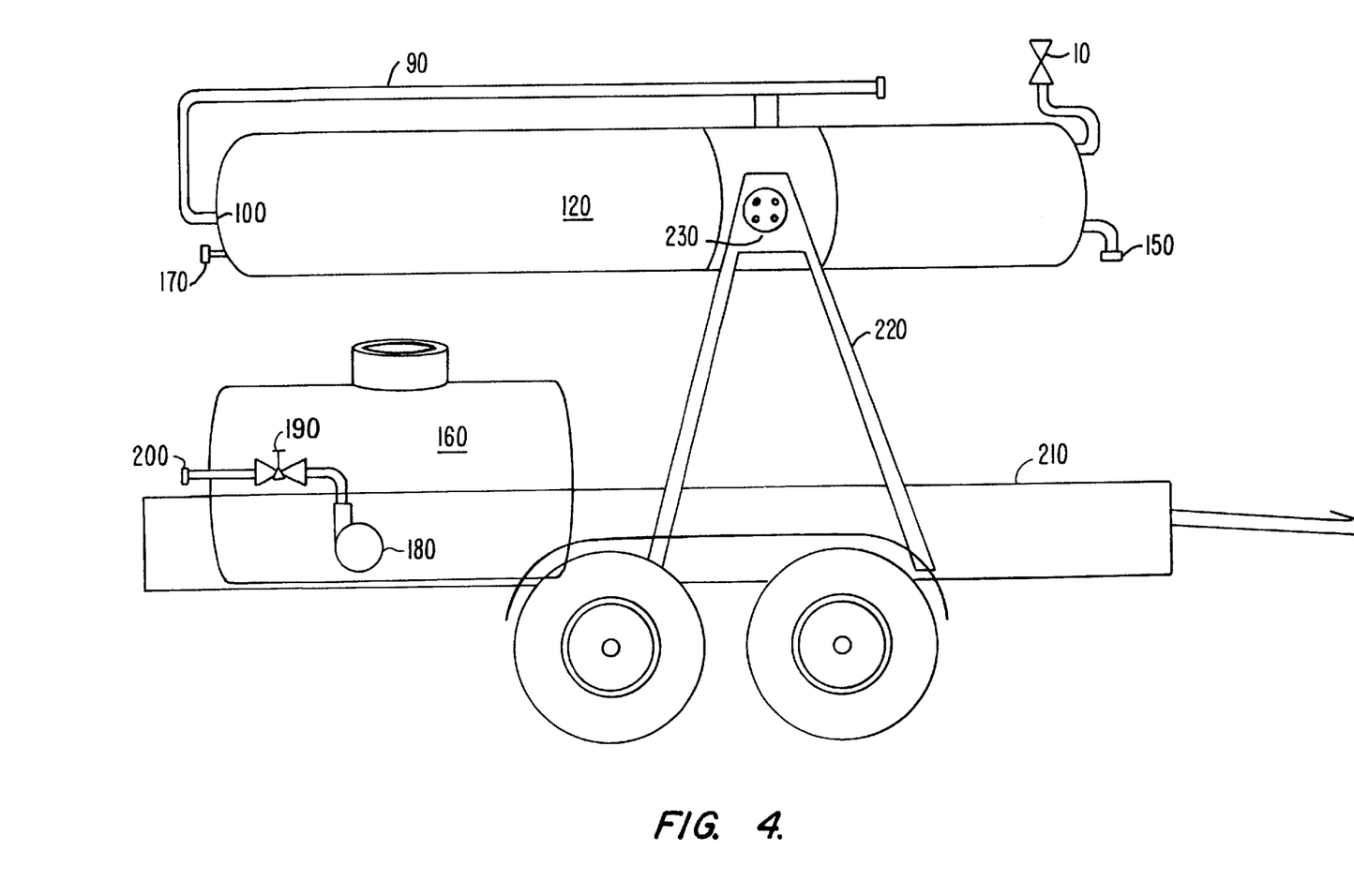
FIG. 4 is an illustration of a device of the invention utilizing two gas-oil contact devices, arranged for transportation.

In FIG. 4 the venturi unit has been detached from inert gas conduit 125. Conduit 150 has also been uncoupled from hold up tank 160. Similarly, conduit 215 is uncoupled form both the venturi device and packed column inlet 190 and the packed bed column has been rotated into a horizontal position for ease of transportation.

The methods and devices of the present invention are further illustrated by the examples which follow. These examples are offered to illustrate, but not to limit the claimed invention.

EXAMPLES

Example 1 details the structure and operation of a device of the invention

Example 1

The portable oil degasification apparatus is mounted on a 6 foot wide by 12 foot long flat bed trailer with one foot high sides all around. A completely sealed steel liner was installed into the bed to provide complete containment of any potential oil spill. A one inch drain line with shut off valve was added to the bottom of the liner at the back of the trailer to provide a means of removing any oil or rain water that accumulate in the trailer. An anti-skid surface was applied to the bed liner as a safety feature reducing the potential for an operator to slip. All piping, pumps, tanks and gas-oil contact equipment were designed to fit within the size constraints of the trailer to eliminate the possibility of spills during operation or transport. The packed bed column is supported on two steel frames on each side of the column. Spindles are attached to the column on each side which fit inside bearing hubs attached to each of the steel support frames. The column pivots on these axles from the horizontal transport position to the vertical operation position. The axles are positioned along the length of the column to minimize the height of the steel support frames while providing proper weight distribution for ease of operation. The present axle position for the 10 foot column is 6 feet down from the top or 4 feet up from the bottom. With these dimensions the column is adequately balanced such that one person can raise and lower the column between the horizontal and vertical positions. The column is locked in the vertical position with a ⅜ inch pin that is inserted into holes drilled through the bearing and axle. During horizontal transport the end of the column is supported with a steel frame and cradle in which the column rests, approximately 1 foot from the top on the column. As the column is raised to the vertical position the 2 inch drain line is connected to the hold-up tank with a 2 inch camlok connector. The inert gas line which is made of ½ inch braided stainless steel is connected to the column gas inlet with a Swagelok® quick connect fitting.

Contaminated oil from the electrical equipment is passed through a 2 inch electrically bonded clear flexible hose which is connected to the portable oil degasification apparatus inlet with a 2 inch camlok connector. The oil inlet connection is at a 24 inch elevation above the trailer bed so that a standard 5 gallon bucket can be placed under the connector to catch any small spills during hook-up and disconnect. A 2 inch isolation valve is used for positive flow shut offjust downstream of the oil inlet connection. An explosion proof 1 horsepower centrifugal type pump mounted on the trailer bed transfers contaminated oil from the electrical equipment through the first two gas oil contact devices. A 2 inch flow regulating valve located downstream of the centrifugal pump provides manual control for the flow of oil through process. The flow rate of oil is measured with a turbine type flow meter inserted in the oil line 20 diameters downstream from the flow control valve. This flow meter provides local flow indication for the operator to set flow rates of both the oil and the inert gas.

The oil enters the venturi gas-oil contact device where an intimate mixture of inert gas bubbles and oil is generated. Pressurized inert gas is regulated to 25 psig as it enters a common manifold from which several streams are taken through several control valve flow meter arrangements. The inert gas leaves the manifold passing through a manual flow control valve and rotometer which measures the flow rate of the inert gas. Gas from the rotometer is piped through ½ inch stainless steel tubing and introduced into the throat of the venturi where it mixes with the oil. The gas-oil mixture exits the venturi passing through about 20 feet of 2 inch pipe providing adequate residence time for the dissolved combustible components to equilibrate into the inert gas bubbles.

The gas-oil mixture enters the second gas-oil contactor which is an 18 inch diameter 10 foot long packed bed column. The column is fabricated either from schedule 40 PVC or ⅛ inch wall aluminum pipe. The column is packed with a 1 inch nominal saddle type random packing. The overall height of the packed bed is 8 feet supported on both ends with packing supports. This leaves a 1 foot space at each end for engagement and disengagement of the oil and gas. The gas oil mixture is discharged into the top of the packed bed column through a spray header arrangement.

The header drains the gas oil mixture through 24, ¼ inch holes strategically located to provide excellent distribution of the gas-oil mixture over the top of the packing. As the oil cascades down through the random packing the gas disengages from the oil. Additional gas is metered into the bottom of the packed bed column from the inert gas manifold through a manual flow control valve and rotometer which measures the flow rate of the inert gas. The gas is distributed through a 15 inch i.d. ring made from 2 inch stainless steel tubing in which 16, ¼ inch holes were drilled evenly about the ring. The inert gas passes up through the packed column and is exhausted to the atmosphere through a 1 inch vent in the top of the column. Gravity draws the oil down through the packing where it then drains through a 2 inch drain in the bottom. The drain is connected to the hold-up tank with a 1 foot section of 2 inch clear hose with camlok fittings on each end.

The present configuration of the column operates with an inert gas to oil ratio of about 0.2 cubic feet gas per gallon of oil. The total combustible gas concentration in the inert gas exhausted from the column rarely exceeds 1%. Thus, the potential for ignition of the extracted combustible gas is very remote. The overall extraction efficiency for the combined venturi and packed bed column with eight feet of packing is in excess of 85% hydrogen, 75% methane, 65% ethane, 50% ethylene and 50% acetylene.

The oil passes through the drain line into the hold-up tank, which serves two purposes. The first is to maintain adequate level in the hold-up tank providing a liquid seal to the bottom of the column to block any inert gas from passing out of the drain line with the oil. The second is to provide sufficient level for positive suction pressure on the discharge pump. Oil is pumped from the hold-up tank through a 2 inch drain line connected to an explosion proof 1 horse power centrifugal type pump mounted on the trailer bed. A constant oil level is maintained in the hold-up tank with a level control type scheme. A capacitive type level indicator measures the level in the hold-up tank and the measured value is transmitted to a PID type controller. The PID controller evaluates the measured value of the hold-up tank level compared to the desired setpoint in the controller by the operator. The PID controller makes corrections to hold-up tank level by adjusting the position of the automatic control valve located in the line on the discharge side of the centrifugal pump. If the measured hold-up tank level is lower than the desired setpoint, the PID controller closes the automatic control valve slightly thus reducing the discharge flow rate of oil resulting in a raising of the oil level in the hold-up tank. If the measured hold-up tank level is higher than the desired setpoint, the PID controller opens the automatic control valve slightly thus increasing the discharge flow rate of oil resulting in a lowering of the oil level in the hold-up tank. In case of a failure to maintain hold-up tank level, alarms are sounded for operator attention if the level becomes either too high or too low in the hold-up tank. All electric contacts, relays and controls are housed in a cabinet which is purged with a small flow of nitrogen providing an intrinsically safe environment. A manual bypass was installed as a back-up to allow the operator to manually control the automatic control valve. A redundant 2 inch manual control/isolation valve was also placed in the line downstream from the automatic control valve.

The oil is then either discharged directly to an external storage tank or it is directed through a third venturi type gas-oil contact device before being sent to the external storage tank. If the venturi is used, inert gas leaves the manifold and passes through a manual flow control valve and rotometer which measures the flow rate of the inert gas. Gas from the rotometer is piped through ½ inch stainless steel tubing and introduced into the throat of the venturi where it mixes with the oil. The oil or gas-oil mixture is discharged from the portable oil degasification unit through a 2 inch electrically bonded clear flexible hose which is connected to the storage tank inlet with a 2 inch camlok connector. The inert gas containing combustible gas components is vented to the atmosphere from the top of the storage tank.

Example 2

Example 2 illustrates the use of a device substantially similar to that discussed in Example 1, with the exception that a third gas-oil contact device is utilized downstream from the packed column. The transfer of combustible gases out of the oil is increased by the use of the third device.

The oil from the packed bed is pumped through a second venturi contactor to provide additional combustible gas removal from the oil being pumped to temporary storage. The present configuration of the second venturi operates with an inert gas to oil ratio of about 0.1 cubic feet gas per gallon of oil. The venturi contactor is capable of extracting as much as an additional 55% hydrogen, 50% methane, 28% ethane, 15% ethylene and 40% acetylene from the oil leaving the packed bed column. Thus the third stage contact with the second venturi further helps to reduce the height requirement of the packed bed column. The overall expected combustible gas extraction efficiencies using the two venturi's and the packed bed column would be 93% hydrogen, 86% methane, 75% ethane, 58% ethylene and 66% acetylene. The second venturi is preferably used when combustible gas concentrations in the oil are very high requiring the additional extraction to achieve specified concentrations for safe storage. The gas-oil mixture is then pumped to the storage tank where the gas would disengage from the oil and be exhausted through the tank vent. The combustible gas concentration in the inert gas stream venting from the storage tank would be much less than 1% so the potential for ignition is very remote.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method, utilizing a device, for reducing combustible gas concentration in an oil containing combustible gas, said method comprising:
   (a) introducing into a first gas oil-contact device said oil containing combustible gas;
   (b) contacting a first inert gas and said oil containing combustible gas in said first gas-oil contact device to form a first inert gas-oil mixture;
   (c) passing said first inert gas-oil mixture into a second gas-oil contact device comprising a packed bed wherein said first gas-oil mixture and a second inert gas are contacted in countercurrent flows, thereby forming a combustible gas-inert gas mixture and a second inert gas-oil mixture;
   (d) venting said combustible gas-inert gas mixture from said device; and
   (e) removing said second inert gas-oil mixture from said device.

2. A method according to claim 1, wherein said first gas-oil contact device is a member selected from the group consisting of venturi devices, spray tower devices, tray tower devices and packed column devices.

3. A method according to claim 1, wherein said first inert gas and said second inert gas are members independently selected from the group consisting of air, nitrogen, argon, helium, carbon dioxide and combinations thereof.

4. A method according to claim 1, wherein said packed bed comprises a packing which is a member selected from the group consisting of meshes Raschig rings, saddles, beads, coils, helices and combinations thereof.

5. The method according to claim 1, wherein said packing is made from a material which is a member selected from the group consisting of glass, teflon, metal, plastics, ceramics and combinations thereof.

6. The method according to claim 1, further comprising draining said oil from said column.

7. A transportable device for reducing combustible gas concentration in an oil containing combustible gas, comprising:
 a column for a packed bed, pivotally mounted to a trailer bed, said column pivoting between a first operable position in which said column is vertical and a second transportable position in which said column is horizontal;
 an inert gas-oil contact device mounted to said trailer bed, said device combining oil and inert gas flows into an inert gas-oil mixture; and
 a manifold, mounted to said trailer bed, providing means for passing said inert gas-oil mixture from said inert gas-oil contact device and said inert gas into said column in countercurrent flows when said column is in said first operable position.

8. The device according to claim 7, wherein said first gas-oil contact device is a member selected from the group consisting of venturi devices, splay tower devices, tray tower devices and packed column devices.

9. The device according to claim 7, wherein said first gas-oil contact device comprises at least two gas-oil contact devices.

10. The device according to claim 7, wherein said first inert gas and said second inert gas are members independently selected from the group consisting of air, nitrogen, argon, helium, carbon dioxide and combinations thereof.

11. The device according to claim 7, wherein said column comprises a support for said packed bed.

12. The device according to claim 7, wherein said column comprises at least two packed beds.

13. The device according to claim 12, wherein said column comprises a support for each of said at least two packed beds.

14. The device according to claim 7, wherein said packed bed comprises a packing which is a member selected from the group consisting of meshes, Raschig rings, saddles, beads, coils, helices and combinations thereof.

15. The device according to claim 7, wherein said packing is made from a material which is a member selected from the group consisting of glass, teflon, metal, plastics, ceramics and combinations thereof.

16. The device according to claim 7, wherein said packing is a polypropylene saddle.

17. The device according to claim 16, wherein said polypropylene saddle is from about 0.5 inches in length to about 1.5 inches in length.

18. The device according to claim 7, further comprising an oil distribution device.

19. The device according to claim 18, wherein said oil distribution device is a member selected from the group consisting of perforated pipe distributors, orifice distributors, trough distributors, weir-riser distributors, spray nozzles and combinations thereof.

* * * * *

UNITED STATES PATENT AND TRADEMARK OFFICE
CERTIFICATE OF CORRECTION

PATENT NO.     : 6,193,786 B1
DATED          : February 27, 2001
INVENTOR(S)    : J. Henderson It is certified that error appears in the above-identified patent and that said Letters Patent is hereby corrected as shown below:

<u>Column 16,</u>
Line 1, replace "splay" with -- spray --.

Signed and Sealed this

Twenty-fifth Day of February, 2003

JAMES E. ROGAN
*Director of the United States Patent and Trademark Office*